3,824,278
1,6-DISUBSTITUTED PYROCATECHOL
DERIVATIVES
Eugene E. Galantay, Morristown, N.J., assignor to
Sandoz-Wander, Inc., Hanover, N.J.
No Drawing. Filed Mar. 23, 1972, Ser. No. 237,497
The portion of the term of the patent subsequent to
Apr. 16, 1990, has been disclaimed
Int. Cl. C07c 65/02, 65/20
U.S. Cl. 260—521 R    9 Claims

ABSTRACT OF THE DISCLOSURE

Disclosed are compounds of the formula

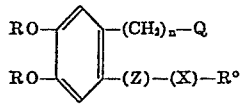

wherein Z is —$CH_2$—$CH_2$— or —CH=CH—; X is —CO— or —COHR'—; R' is hydrogen or lower alkyl; Q is —$CH_2OH$, —COR" or —CHO; R° is alkyl of 4 to 6 carbon atoms; n is 4, 5 or 6; R is hydrogen or lower alkyl; R" is hydrogen or a cation forming a pharmaceutically acceptable salt; e.g. 1-[3',4'-dimethoxy-6'-(5"-carboxypentyl)phenyl]-1-octan-3-ol sodium salt: said compounds exhibiting pharmacological activity in animals and useful, for example, as bronchodilator agents. The compound in which X is —CHOH— with Z being

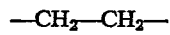

and Q being —COR" or —$CH_2OH$ may be prepared, for example, by reduction of a corresponding compound in which X is —CO—. Said compounds in which X is —CO— may be produced by catalytic hydrogenation of a corresponding compound in which Z is —CH=CH— and the latter compounds in which Q is COR" may be produced by complete terminal oxidation of a corresponding key compound in which Q is —$CH_2OH$, e.g. 1-[3',4'-dimethoxy-6'-(6"-hydroxyhexyl)phenyl] - 1 - octen - 3- one. The compounds in which X is —COH—alkyl— may be produced from compounds in which X is —CO— and Z is —$CH_2$—$CH_2$— by Grignard procedures and the former in which Q is —$CH_2OH$ are used when forming compounds in which Q is —CHO by controlled terminal oxidation and the latter may be used to prepare compounds in which Q is —COR" by complete terminal oxidation. The key compounds may be prepared by reacting a trimethylchlorosilane protected 3,4-disubstituted-6-(ω-hydroxyalkyl) - benzaldehyde with a dialkyl-2-oxo-alkyl phosphorane in the presence of a base.

The present invention relates to 1,6-disubstituted pyrocatechol derivatives, to intermediates in their preparation, and to pharmaceutical compositions and methods utilizing their pharmacological properties.

In one aspect of this invention there is provided compounds of the formula I:

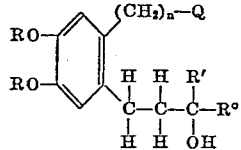

wherein

R° is straight chain alkyl of 4 to 6 carbon atoms, i.e., butyl, pentyl or hexyl,
Q is —$CH_2OH$, —CHO or —COOR",
R" is hydrogen or a cation forming a pharmaceutically acceptable salt,
R' is hydrogen or lower alkyl of 1 to 3 carbon atoms,
n is 4, 5 or 6, and
both R which are the same, are hydrogen or lower alkyl of 1 to 3 carbon atoms;

provided that R' is lower alkyl when Q is —CHO.

Certain of the compounds of the formula I in which R' is hydrogen and having the formula Ia:

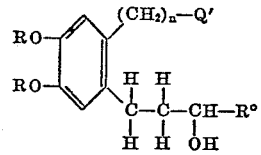

wherein

R°, R and n are as defined, and
Q' is —COOR" or —$CH_2OH$, may be prepared in a Step 1 reaction by subjecting a compound of the formula II

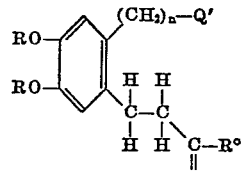

wherein R°, R, n and Q' are as defined, to reduction in a known manner.

The compounds of the formula I in which R' is hydrogen may also be prepared in a Step 2 reaction by subjecting a compound of the above formula II or a compound of the following formula III:

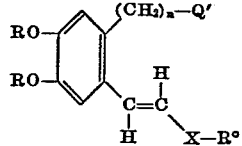

wherein R°, R, Q' and n are as defined, and X is

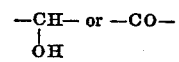

to catalytic hydrogenation in an inert solvent.

Certain of the compounds of the formula I having the formula Ib:

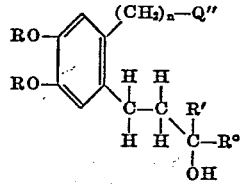

wherein

R°, R, R' and n are as above defined, and
Q" is —CHO or —COOR", provided that R' is lower alkyl when Q" is —CHO, may be prepared by subjecting a compound of the formula Ic:

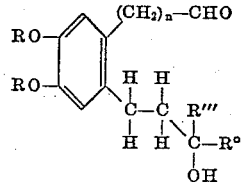

wherein

R°, R, and $n$ are as above defined, and
R''' is lower alkyl of 1 to 3 carbon atoms, to complete terminal oxidation in a Step 3-A to obtain a compound of the formula Ib in which Q'' is —COOH, or by subjecting a compound of the formula Id:

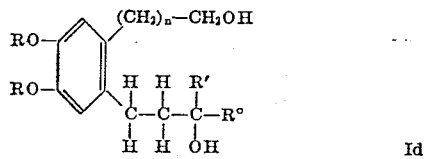

Id wherein R°, R, R' and $n$ are as above defined, to complete terminal oxidation in the Step 3-A reaction to obtain a compound of the formula Ib in which Q'' is —COOR'' or to controlled terminal oxidation in a Step 3-B reaction to obtain a compound of the formula Ic, i.e., a compound of formula Ib in which Q'' is —CHO.

Certain compounds of the formula I in which R' is lower alkyl may be prepared in a Step 4 reaction involving reacting a compound of the formula II with a Grignard compound of the formula IV:

$$R'''MgY \qquad IV$$

wherein

R''' is alkyl of 1 to 3 carbon atoms, and
Y is bromo or iodo.

The compounds of the formula I in which R is H may also be prepared in a Step 5 reaction involving subjecting a corresponding compound of the formula I in which R is alkyl to dealkylation in a known manner.

The preparation of compounds I in which R' is hydrogen by the reduction reaction of Step 1 is conveniently carried out at temperatures in the range of from minus 70° C. to plus 30° C., preferably between minus 10° C. to plus 20° C. employing an alkali metal borohydride as reducing agent, preferably sodium borohydride. The inert solvent is conveniently water which contains a sufficient amount of an alkali metal hydroxide such as sodium hydroxide to neutralize the acid function when Q is —COOH.

The preparation of compounds I in which R' is hydrogen from a compound of the formula II and/or III by the catalytic hydrogenation of Step 2 may be carried out over a fairly wide temperature range of from 10° C. to 30° C., preferably 15° C. to 30° C. The hydrogenation catalyst may be of known type, e.g. palladium supported on carbon, e.g., a catalyst comprising 3-12% palladium on 88-97% charcoal, and rhodium supported on alumina. The hydrogenation is conducted in the presence of an inert solvent which is suitably water and/or a lower alcohol such as ethanol. When Q' in compounds II and III respectively is —COOH the solvent is preferably water containing sufficient alkali metal hydroxide to neutralize said acid. When starting with a compound of the formula I or a compound of the formula III in which X is —CO—, the hydrogenation may be conducted for extended time period to convert such carbonyl group to the sought for alcohol as indicated, for example, by the hydrogen uptake, although in general this reaction is incomplete and leads to mixtures of the desired product and a compound of the formula II which may be separated from the desired product as desired or required. It will thus also be evident that the Step 2 reaction commencing with a compound of the formula III in which X is —CO— provides a convenient and preferred method of preparation of the compounds of the formula II, simply by controlling the hydrogenation, for example, by controlling the uptake of hydrogen, to favor the formation of compounds II and minimize the formation of compounds I. Any mixture of compounds II and I produced thereby may be used in Step 1 directly or, alternately, the compound II may be separated from the compound I prior to the Step 1 reaction.

The reaction of Step 3-A is suitably effected in a known manner employing oxidizing agents suitable for converting an aliphatic alcohol or aldehyde to the corresponding acid. In general, the oxidation may be carried out at temperatures in the range of from minus 10° C. to plus 100° C. and in the presence of an inert organic solvent of conventional type. The compounds Ib in which Q'' is —COOR'' are prepared by oxidation of a compound Id preferably under an inert atmosphere, e.g. nitrogen, employing chromic acid/sulfuric acid (Jones Reagent) as the oxidizing agent and a ketone, e.g. acetone, as the solvent. Preferred temperatures for such oxidation are in the range of from 15° C. to 40° C. The preparation of compounds Ib in which Q'' is —COOR'' from compounds Ic is preferably effected under an inert atmosphere, e.g. nitrogen, preferably employing silver oxide as the oxidizing agent and at temperatures of from minus 10° C. to plus 30° C. Suitable solvents include water and the alcoholic solvents, e.g., ethanol. The reaction product of the formula Ib may be isolated and recovered from the reaction mixture of Step 3-A by working up by conventional procedures.

The reaction of Step 3-B is a controlled oxidation which may be suitably effected in a known manner employing, for example, silver carbonate on celite as the oxidizing agent and elevated temperatures in the range of from 30° C. to 120° C., preferably 70° C. to 110° C. Alternately, the oxidation may be carried out with a suitable metallic alkoxide, e.g., aluminum triisopropoxide, in accordance with the known Oppenauer oxidation. The oxidation, in general, is effected in the presence of an inert organic solvent of conventional type, preferably an aromatic solvent such as benzene, toluene and the like. The resulting product of the formula Ib in which Q'' is —CHO may be isolated and recovered from the reaction mixture of Step D by working up by conventional procedures.

The preparation of compounds I in which R' is alkyl by reaction Step 4 involves a conventional Grignard reaction which may be carried out at temperatures of from minus 10° C. to plus 80° C., followed by hydrolysis in a conventional manner. The reaction is conducted in an inert organic solvent of conventional type for Grignard reactions such as an ether, for example, tetrahydrofuran, dioxane or diethyl ether, and preferably under an inert atmosphere, e.g. nitrogen.

The Step 5 reaction may be carried out in a conventional manner for effecting dealkylation of phenol derivatives and is preferably a demethylation which may be suitably effected with a boron trihalide, e.g., boron trichloride or boron tribromide, in an inert organic solvent of conventional type, e.g., methylene chloride. The dealkylation may be suitably effected at temperatures in the range of from minus 80° C. to plus 40° C., more suitably at temperature of from minus 75° C. to plus 30° C.

The compounds of the formula III having the formula IIIa:

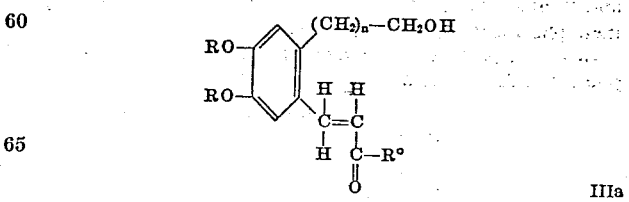

IIIa in which R°, R and $n$ are as above defined, may be prepared in a Step A reaction involving the reaction of a compound of the formula V:

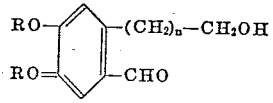

V in which R and n are as above defined, with a compound of the formula VI:

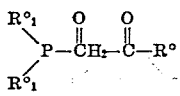
VI in which

R° is as defined, and each R°₁ is lower alkyl of 1 to 3 carbon atoms, while protecting the ω-hydroxyalkyl moiety in a known manner, and followed by removal of the protection to obtain a compound of the formula IIIa.

The compounds of the formula III having the formula IIIb:

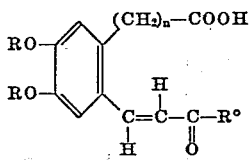
IIIb in which R°, R and n are a defined, are prepared in a Step B by subjecting a compound of the formula IIIa above stated or IIIc:

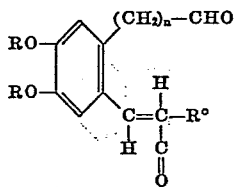
IIIc in which R°, R and n are as defined, to complete terminal oxidation similarly to and in the manner of Step 3–A as above described.

The compounds of the formula III having the formula IIId:

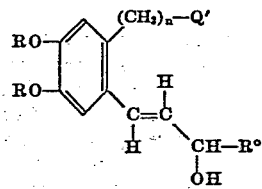
IIId in which R°, R, n and Q' are as defined, may be prepared in a Step C reaction involving reduction of a corresponding compound of the formula IIIa or IIIb similarly to and in the manner of above-described reaction Step 1.

The Step A reaction involving the reaction of compound V with a compound VI is preferably effected in three parts involving the protection of the hydroxyl group or groups on the compound of the formula V followed by the reaction of the protected compound V with the compound VI and finally the removal of the protecting group(s) to obtain the desired compound of the formula IIIa. The preparation of the protected compound V may be effected in a known manner, preferably by reacting the compounds with a suitable reagent to provide a protective group for a hydroxyl group, e.g., trimethyl chlorosilane. The reaction is suitably effected under nitrogen at temperatures of from minus 15° C. to plus 25° C., more suitably from minus 5° C. to plus 10° C., in the presence of a base and inert organic solvent. The base is conveniently pyridine which also serves as solvent for the reaction. The protected compound V is preferably isolated as an oil for use in the next olefin-formation step in which the protected compound V is reacted with the compound VI. The reaction of the protected compound V with the compound VI is suitably carried out in a known manner with the aid of a strong base, e.g., sodium hydride, which is preferably first reacted with the compound VI followed by combining the resulting reaction product with the protected compound V. The olefin-formation is conveniently effected at elevated temperatures in the range of from 30° C. to 100° C., preferably 40° C. to 80° C., and in the presence of an inert organic solvent of known type, preferably an ether such as dimethoxyethane. The protected reaction product of the formula IIIa is then subjected to reaction in a known manner to remove the protecting group(s) and form the compound of the formula IIIa. Such "deprotection" reaction which may be effected without isolation of the protected reaction product is suitably carried out employing a strong acid, e.g., sulfuric acid, at temperatures in the range of from minus 10° C. to plus 70° C., more suitably at from 0° C. to 60° C. It will be evident that the Step A reaction may be varied as desired or required to produce various of the products of the formula IIIa. For example, when R is hydrogen a threefold amount of protecting compound is desirably employed to protect all three hydroxyl groups on the compound of the formula V. In general, the reaction product of the formula IIIa may be isolated and recovered by working up by established procedures.

The compounds of the formula IIIc, stated above, may be prepared by subjecting a compound of the formula IIIa, stated above, to controlled termination oxidation similar to and in the manner of reaction Step 3–B.

The compounds of the formula V employed as starting material in the Step A reaction may be prepared by a Step D reaction by subjecting a compound of the formula VII:

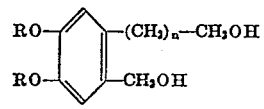
VII wherein R and n are as above defined, to "benzylic oxidation" in known manner.

The compounds of the formula VII may be prepared in a Step E reaction by subjecting a compound of the formula VIII:

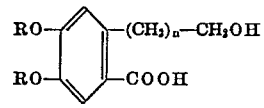
VIII wherein R and n are as defined, to reduction in a known manner.

The compounds of the formula VIII may be prepared in a Step F reaction by subjecting a compound of the formula IX:

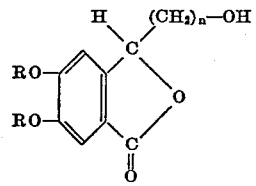
IX wherein R and n are as defined, to catalytic hydrogenation in a known manner.

The compounds of the formula IX may be prepared in a step G reaction involving the reaction of a compound of the formula X:

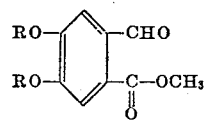
X wherein R is as defined, with a compound of the formula XI:

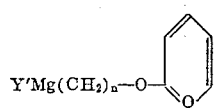
XI wherein n is as defined, and
Y' is chloro, bromo or iodo.

The Step D or "benzylic oxidation" is suitably effected at temperatures in the range of from minus 10° C. to plus 60° C., conveniently at about room temperature. The reaction is carried out in an inert organic solvent of known type, preferably an ether such as dioxane. Suitable oxidizing agents for effecting such selective oxidation are known and include dichlorodicyanobenzoquinone and manganese dioxide, preferably dichlorodicyanobenzoquinone. The reaction product of the formula V may be isolated and recovered by working up by conventional procedures.

The Step E reaction is a reduction reaction which may be carried out in a known manner employing metallic hydrides of the type suitable for reducing a carboxylic acid to the corresponding alcohol, preferably lithium aluminum hydride. The reduction is suitably carried out at temperatures of from 0° C. to 80° C., more suitably 20° C. to 70° C. and in the presence of an inert organic solvent of conventional type, preferably an ether such as tetrahydrofuran. The reaction product of the formula VIII may be isolated from the resulting reaction mixture by working up by conventional procedures.

The reaction Step F may be carried out similarly to and in the manner of reaction Step 2.

The reaction Step G is preferably carried out by first preparing the Grignard compound of the formula XI in an inert organic solvent which may be of suitable conventional type such as an ether, e.g. tetrahydrofuran. The compound of the formula X is then added to the Grignard mixture and the reaction effected in the inert organic solvent medium at temperatures suitably in the range of from minus 10° C. to plus 80° C., preferably minus 20° C. to 70° C. The resulting reaction product is hydrolyzed in a conventional manner, e.g. by acid hydrolysis, and the resulting product of the formula IX may be isolated by working up in a known manner. The compounds of the formulae X and XI employed in Step G are either known per se or may be prepared in a known manner from available materials.

The compounds of the formula V may also be prepared in a Step (a) reaction involving subjecting a compound of the formula XII:

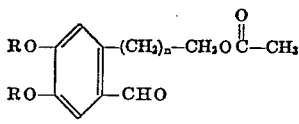

XII wherein R and n are as above defined, to the action of a base in an inert medium.

The compounds of the formula XII may be prepared in a Step (b) reaction involving subjecting a compound of the formula XIII:

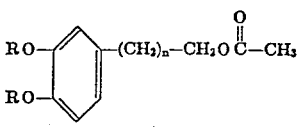

XIII wherein R and n are as defined, to reaction with zinc cyanide in the presence of hydrogen chloride in an inert solvent.

The compounds of the formula XIII may be prepared in a Step (c) reaction involving acylating a compound of the formula XIV:

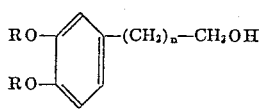

XIV wherein R and n are as defined, in a known manner.

The compounds of the formula XIV may be prepared in a Step (d) reaction involving reducing a compound of the formula XV:

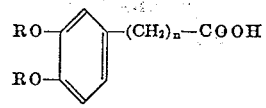

XV wherein R and n are as defined, in a known manner.

The compounds of the formula XV may be prepared in a Step (e) reaction involving hydrogenating a compound of the formula XVI:

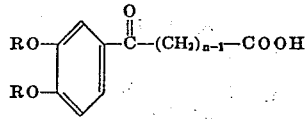

XVI wherein R and n are as defined, in a known manner.

The compounds of the formula XVI may be prepared in a Step (f) reaction which is an addition reaction in which a compound of the formula XVII:

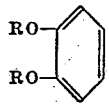

XVII in which R is as defined, is reacted with a compound of the formula XVIII

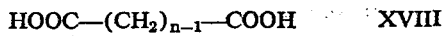

HOOC—$(CH_2)_{n-1}$—COOH    XVIII wherein n is as above defined in the presence of a reducing catalyst.

The reaction Step (a) is conveniently carried out in an inert organic solvent such as a lower alkanol, e.g. methanol and under an inert atmosphere such as nitrogen. The preferred bases are the alkali metal hydroxides, e.g. potassium hydroxide. Reaction temperatures are suitably of the order of from 0° C. to 60° C., preferably 15° C. to 30° C.

The reaction Step (b) is the known Gattermann reaction which is effected by first reacting the compound of the formula XIII with zinc cyanide and hydrogen chloride in an inert organic solvent such as an aromatic solvent, e.g. benzene. The reaction is preferably commenced at lower temperatures, e.g. 0° C. to 25° C. and completed at somewhat higher temperatures, e.g. 30° C. to 60° C., and followed by hydrolysis in a known manner.

The reaction Step (c) is a conventional esterification which may be carried out at temperatures between minus 20° C. to plus 30° C., preferably minus 5° C. to plus 10° C. and preferably employing acetic anhydride in pyridine as solvent and acid binding agent.

The reaction Step (d) is a reduction which may be carried out similarly to and in the manner of reaction Step E.

The reaction Step (e) is a catalytic hydrogenation reaction of known type and may be carried out similarly to and in the manner of reaction Step 2.

The reaction Step (f) is of a known type addition reaction suitably carried out at temperatures between 0° C. to 80° C., preferably 15° C. to 50° C., and in the presence of an inert organic solvent such as chlorinated hydrocarbon, preferably 1,1,2,2-tetrachloroethane. A preferred reducing catalyst is boron trifluoride etherate. The compound of the formula XVIII is preferably employed in anhydride form. The desired reaction product of the formula XVI may be recovered by working up by conventional procedures.

The compounds of the formula XVII and XVIII are either known per se or may be produced from available materials by known procedures.

Included within the scope of the pharmacologically active compounds of the invention are those pharmaceutically acceptable salt forms of the free acids in which Q is —COOH, i.e. the compounds in which R" is a cation forming a pharmaceutically acceptable salt. Such salts forming pharmaceutically acceptable compounds include, by way of illustration, the sodium salt and triethyl ammonium salt. In general, the salts may be produced from the free acids by established procedures. Conversely, the free acids may be obtained from the salts by well-known procedures.

The compounds of formulae I, II, III and IIIc are useful because they possess pharmacological activity in animals. In particular, said compounds are useful as bronchodilator agents as indicated *in vitro* by observing the effect on strips of guinea pig trachae according to the method of Constantine, J. Pharm. Pharmacol. 17: 384–385, 1960, at concentration of active compound of from 10 to 100 micrograms per milliliter. For such use and depending upon known variables satisfactory results are obtained in general on the daily administration of from 4 to 200 milligrams per kilogram of body weight, preferably given in divided doses 2 to 4 times a day, or in sustained release form. For most larger mammals the administration of from 300 to 2000 milligrams per day provides satisfactory results and dosage forms suitable for internal administration comprise 75 to 1000 milligrams of the compound in admixture with a solid or liquid pharmaceutical carrier or diluent.

The compounds of the formulae I, II, III and IIIc also effect an increase in progesterone synthesis *in vitro* in the rat ovary at concentration of active compound of from 20 to 150 micrograms per milliliter, and thus are further indicated for use as fertility control agents to control reproduction by means of expulsion of the embryo from the reproductive tract on administration during the early stages of pregnancy. For fertility control usage, the compounds may be combined with a pharmaceutically acceptable carrier or adjuvant and administered by a variety of modes, e.g. intravenously, subcutaneously, intramuscularly, rectally, intravaginally, buccally, sublingually, and by sustained release implants. The dosage will vary depending upon known factors such as mode of administration and the compound employed. However, in general, satisfactory results are obtained when the compounds are administered at a total daily dosage of from 0.1 to 100 milligrams per kilogram of animal body weight. For most mammals the daily administration during the early stages of pregnancy of from 5 to 500 milligrams provides satisfactory results and dosage forms suitable for internal administration comprise from about 2 milligrams to about 250 milligrams of the compound in admixture with a solid or liquid pharmaceutical carrier or diluent.

The compounds of the formulae I, II, III and IIIc may be administered orally or by inhalation therapy as bronchodilators. Oral administration with carriers is preferred and may take place in such conventional forms as tablets, dispersible powders, granules, capsules, suspensions, syrups and elixirs. Such compositions may be prepared according to any method known in the art for the manufacture of pharmaceutical adjuvants, such as sweetening agents, flavoring agents, coloring agents and preserving agents, in order to provide an elegant and palatable preparation. Tablets may contain the active ingredient in admixture with conventional pharmaceutical excipients, e.g. inert diluents such as calcium phosphate, calcium sulphate dihydrate, lactose and talc, granulating and disintegrating agents, e.g. starch and alginic acid, binding agents, e.g. starch, polyvinyl pyrrolidone, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g. suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium sulphate dihydrate, calcium phosphate and kaolin. Administration by inhalation therapy may be effected in a conventional manner, e.g. by the use of nebulizers, vaporizers, aerosols and the like. Compositions for use by administration by inhalation therapy may be prepared according to conventional procedures and contain the usual conventional ingredients employed in such compositions.

For use as fertility control agents the compound of the formulae I, II, III and IIIc may be formulated in a conventional manner to contain an effective dose of the active ingredient together with an inert pharmaceutically acceptable carrier or diluent adapted to provide a composition suitable for the desired mode of administration. For buccal or sublingual administration, the compositions may take such conventional forms as tablets, capsules, and the like which may be prepared by known methods and which may contain one or more conventional adjuvants, such as sweetening agents, flavoring agents, coloring agents and preserving agents; or conventional pharmaceutical excipients, e.g., inert diluents, granulating and disintegrating agents, lubricating agents, suspending agents and wetting agents. For intravenous or subcutaneous administration there may be utilized the conventional forms such as sterile solutions or suspensions of the active ingredient in aqueous or nonaqueous mediums or isotonic solutions when a pharmaceutically acceptable salt is utilized. For rectal or vaginal administration suppositories formulated and prepared in a conventional manner may be employed. A sterile capsule of conventional materials such as silicone rubber may be prepared by established procedures and utilized for administration by an implant.

A representative formulation is a tablet for oral administration 2 to 4 times a day for prophylactic treatment of bronchial asthma and prepared by conventional tabletting techniques to contain the following ingredients:

| Ingredients: | Weight (mg.) |
|---|---|
| 1 - [3',4' - dimethoxy - 6'(5''-carboxypentyl) phenyl]-1-octan-3-ol | 125 |
| Tragacanth | 10 |
| Lactose | 197.5 |
| Corn starch | 25 |
| Talcum | 15 |
| Magnesium stearate | 2.5 |

A representative aerosol formulation prepared by conventional techniques for use with a metered value system contains the following ingredients:

| Ingredients: | Weight (mg.) percent |
|---|---|
| 1 - [3',4' - dimethoxy - 6'(5''-carboxypentyl) phenyl]-1-octan-3-ol sodium salt | 0.4–20 |
| Ethyl alcohol | 10–40 |
| Ascorbic acid | 1–10 |
| Freon 11 | 10–30 |
| Freon 114 | 10–30 |
| Freon 12 | 30–60 |
| Buffer System—pH control q.s. | |
| Flavor q.s. | |

The following examples show representative compounds encompassed within the scope of this invention and the manner in which such compounds are prepared. However, it is to be understood that the examples are for purposes of illustration only.

EXAMPLE 1

3,4-Dimethoxy-6-(6'-hydroxyhexyl)-benzaldehyde

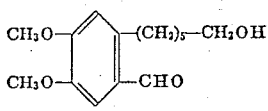

Step A: Preparation of 5,6-Dimethoxy-3-(5'-hydroxypentyl)-phthalide.—To a Grignard mixture prepared from 5.760 of magnesium and 49.3 g. of 1-chloro-5-tetrahydropyranyl-oxypentane in a total of 67 ml. of anhydrous tetrahydrofuran, there is dropwise added, at $-10°$ C., a solution of 41.3 g. of 2-carbomethoxy-4,5-dimethoxybenzaldehyde (m.p. 92-8° C.) ml. of anhydrous tetrahydrofuran. After the finished addition, the mixture is allowed to attain room temperature and is finally heated under reflux for 2 hours. Then the re-cooled mixture is poured onto a mixture of 6N hydrochloric acid and ice; the tetrahydrofuran is stripped off *in vacuo*, the residue taken up in ethyl acetate and the ether solution, after washing with water and drying over sodium sulfate, is re-evaporated to a yellow solid (55 g.). Trituration with ether gives the product which, after recrystallization from ethyl acetate, has a m.p. of 122-4° C.

Step B: Preparation of 3,4-Dimethoxy-6-(6'-hydroxyhexyl)-benzoic acid.—A sample of 29.7 g. of 5,6-dimethoxy-3-(5'-hydroxypentyl)-phthalide is heated with 120 ml. of 1N aqueous sodium hydroxide solution and 180 ml. of water. The solution thus obtained is shaken, in the presence of 2.97 g. of Pd/C 10% catalyst in a steel autoclave, at 180° C. and under a hydrogen pressure of 1200 p.s.i.g., until the expected amount of hydrogen has been taken up. After cooling, the solution is filtered from the catalyst and acidified with 2N hydrochloric acid to a pH of 1. The reaction product precipitates and is isolated by filtration: m.p. 126-8° C.

Step C: Preparation of 3,4-Dimethoxy-6-(6'-hydroxyhexyl)-benzylalcohol.—To a refluxing mixture of 7.3 g. of lithium aluminum hydride in 340 ml. of tetrahydrofuran, there is dropwise added a solution of 27 g. of 3,4-dimethoxy-6-(6'-hydroxyhexyl)-benzoic acid in 85 ml. of tetrahydrofuran. After one hour of further refluxing, the mixture is cooled and acidified with the dropwise addition of 150 ml. of 2N hydrochloric acid. The oily product is extracted with methylene chloride.

Step D: Preparation of 3,4-Dimethoxy-6-(6'-hydroxyhexyl)-benzaldehyde.—To a solution of 25.6 g. of 3,4-dimethoxy-6-(6'-hydroxyhexyl)-benzylalcohol in 256 ml. of dioxane there is dropwise added a solution of 27.0 g. of dichloro-dicyano-benzoquinone in 148 ml. of dioxane. After 2 hours at room temperature, a solution of 22.3 g. of potassium carbonate and 9.55 g. of sodium dithionate in 206 ml. of water is dropwise added then the whole mixture is poured into 1640 ml. of saturated brine. Ether extraction gives the product as an oil.

EXAMPLE 2

3,4-Dimethoxy-6-(6'-hydroxyhexyl)benzaldehyde (alternative process)

Step A: Preparation of 5 - (3',4'-Dimethoxybenzoyl) valeric acid.—To a solution at 15-20° C. of 190.4 gm. of adipic anhydride in 1 liter of 1,1,2,2-tetrachloroethane is added in one portion 185 gm. of veratrole. Then in a five minute period is dropwise added 19.4 ml. of Boron trifluoride etherate. The resulting dark solution is stirred at 15-20° C. for 3½ hours and then heated to 45° C. for 20 minutes. After cooling, the solution is poured on ice and extracted with 2 liters of chloroform. The organic phase is extracted with 10% $K_2CO_3$ solution. Upon acidification to pH 1 with hydrochloric acid, the product precipitates. After recrystallization from hot Ethanol, the product has a m.p. of 111-115° C.

Step B: Preparation of 6 - (3',4'-Dimethoxyphenyl) caproic acid.—A solution of 47 gm. of 3,4-dimethoxy-6-(6' - hydroxyhexyl)-benzaldehyde in 283 ml. p-Dioxane containing 1.28 ml. of concentrated sulfuric acid is shaken, in the presence of 1.57 gm. of 10% Palladium on carbon catalyst at 70° C. and under hydrogen pressure of 50 p.s.i. until the expected amount of hydrogen has been taken up. After cooling, the solution is filtered from the catalyst. To this solution is added 50 ml. of 10% sodium bicarbonate solution. Sodium sulfate precipates and is removed by filtration. The solution is evaporated to near dryness and then diluted with water. The product oils out from the solution and upon cooling crystallizes. The product, isolated by filtration, has a m.p. of 52-57° C.

Step C: Preparation of 6 - (3',4'-Dimethoxyphenyl)-1-hexanol.—To a refluxing solution of 9.45 gm. of lithium aluminum hydride in 585 ml. of dry tetrahydrofuran is added dropwise a solution of 41.48 gm. of 6-(3',4'-dimethylphenyl) caproic acid in 145 ml. of dry tetrahydrofuran. After refluxing one hour, the mixture is cooled and acidified with the dropwise addition of 205 ml. of 60% sodium potassium tartorate solution. The *oily* product is extracted with methylene chloride.

Step D: Preparation of 6-(3',4'-Dimethoxyphenyl)-1-acetoxy hexane.—To a solution of 39.1 gm. of 6-(3',4'-dimethoxyphenyl)-1-hexanol in 410 ml. of dry pyridine is added 180 ml. of acetic anhydride. The solution is placed in the refrigerator for 16 hours. Then the solution is poured onto ice and extracted with ethylacetate. Distillation under vacuum give a colorless *oil*.

Step E: Preparation of 3,4-Dimethoxy-6-(6'-acetoxyhexyl)-benzaldehyde.—To a mixture of 40 gm. of 6-(3',4'-dimethoxyphenyl)-1-acetoxy hexane and 38.5 ml. of dry benzene is added 29.2 gm. of dry zinc cyanide. Dry hydrogen chloride gas is added rapidly to the cooled and continuously stirred mixture for sixty minutes. Next anhydrous aluminum chloride 27.5 gm. is slowly added and with further cooling and stirring. This is followed by a slow stream of hydrogen chloride gas which is added while the mixture is heated at 40-45° C. for 3 hours. Then 200 ml. of 2-Normal hydrochloric acid is dropwise added and the mixture is refluxed one-half hour. After cooling, the *oily* product is extracted with ethyl acetate.

Step F: Preparation of 3,4-Dimethoxy-6-(6'-hydroxyhexyl)-benzaldehyde.—A solution of 42 gm. of 3,4-dimethoxy-6-(6'-acetoxy-hexyl)-benzaldehyde in 593 ml. of 1-Normal potassium hydroxide in methanol is stirred for 3 hours under nitrogen atmosphere. The solution is poured into cold water and the *oily* product is extracted with methylene chloride.

EXAMPLE 3

3,4-Dimethoxy-6-(6'-trimethylsilylyloxyhexyl) benzaldehyde

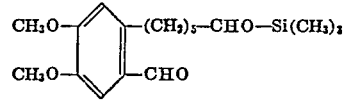

To a stirred solution under nitrogen atmosphere at 0° C. of 20.9 gm. of the product of Examples 1 or 2 in 98 ml. of dry pyridine is added 11.5 ml. of trimethylchlorosilane. After stirring 1 hour at 0° C., the mixture is evaporated to dryness. The residue is taken up in ice cold ethyl acetate and after washing with ice cold saturated copper sulfate solution, water, and brine, and drying over sodium sulfate, the product is re-evaporated to an oil.

EXAMPLE 4

1-[3',4'-Dimethoxy-6'-(6''-hydroxyhexyl)phenyl]-1-octen-3-one

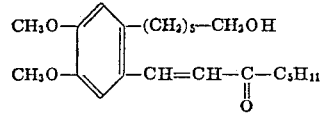

Sodium hydride prepared by washing 8.6 gm. of a commerically obtained 57% suspension of sodium hydride with petroleum ether is suspended in 510 ml. of dry 1,2-dimethoxyethane and to this mixture is added dropwise 45.3 gm. of dimethyl-2-oxoheptyl phosphorate. The resulting mixture is stirred for 2 hours and there is then added thereto a solution of 34.4 gm. of 3,4-dimethoxy-6-(6'-trimethylsilyloxyhexyl) benzaldehyde in 165 ml. of dry 1,2-dimethoxyethane. The resulting mixture is heated under reflux for 3 hours, cooled, and treated by addition of 140 ml. of 35% sulfuric acid. The mixture is heated to 50° C. for 10 minutes, cooled, and the product is obtained by extraction with ethyl acetate; m.p. 42–48° C.

EXAMPLE 5

1-[3',4'-Dimethoxy-6'-(6''-hydroxyhexyl)phenyl]-1-octan-3-one

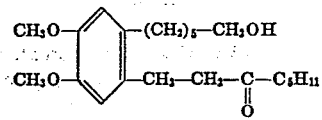

A solution of 10 gm. of 1-[3'-4'-dimethoxy-6'-(6''-hydroxyhexyl)phenyl]-1-octen-3-one in 150 ml. of ethanol is shaken atmospherically in the presence of 1.42 gm. of 5% Rhodium on alumina catalyst under hydrogen gas until the expected amount of hydrogen has been taken up. The solution is filtered through Celite to remove the catalyst and evaporated to give the titled product.

EXAMPLE 6

1-[3',4'-Dimethoxy-6'-(6''-hydroxyhexyl)phenyl]-3-methyloctan-3-ol

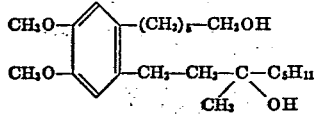

To a solution of 17.1 ml. of 2-molar methylmagnesium bromide solution in tetrahydrofuran/Benzene in 57 ml. of dry tetrahydrofuran is dropwise added at room temperature under a nitrogen atmosphere a solution of 5.7 gm. 1-[3',4'-dimethoxy-6'-(6''-hydroxyhexyl)phenyl]-1-octan-3-one in 28.5 ml. of dry tetrahydrofuran. After addition is complete, the mixture is stirred for 1 hour at room temperature. Another 2 ml. of the methylmagnesium bromide solution is added and the mixture stirred for 30 minutes. The resulting solution is quenched with ammonium chloride solution, extracted with ethyl acetate, water washed, treated with brine, dried and evaporated to dryness to obtain an oil of the titled product.

EXAMPLE 7

1-[3',4'-Dimethoxy-6'-(6''-oxahexyl)phenyl]-3-methyloctan-3-ol

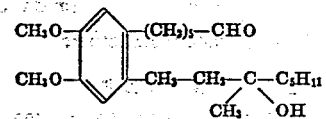

A mixture of 82.5 gms. of silver carbonate on celite (prepared from 150 gms. Celite, 170 gm. of silver nitrate and 55.65 gm. of sodium carbonate), 5.5 gm. of 1-[3',4'-dimethoxy 6'-(6''-hydroxyhexyl)phenyl]-3-methyloctan-3-ol and 870 ml. of toluene is azeotropically refluxed for 15–20 hours. The resulting mixture is filtered with the residue being washed with ethyl acetate. The filtrate is evaporated to dryness and purified by column chromatography with prep-plates using silica gel and eluting with benzene/chloroform (1:1 increasing to pure chloroform) and the first fraction is evaporated in vacuo to obtain an oil of the titled product.

EXAMPLE 8

1-[3',4'-Dimethoxy-6'-(5''-carboxypentyl)phenyl]-3-methyloctan-3-ol

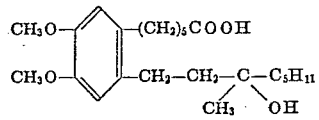

Silver oxide is prepared by adding a solution of 3.3 g. of silver nitrate in 6.6 ml. of water to a solution of 1.56 g. of sodium hydroxide in 6.6 ml. of water. Continuous shaking during the addition ensures complete reaction and results in a brown semi-solid mixture to which 5–10 ml. of water is added. To this mixture is added at 0° C. under nitrogen 3.56 g. of 1-[3',4'-dimethoxy-6'-(6''-oxahexyl)phenyl]-3-methyloctan-3-ol in small portions with stirring. The black silver suspension is removed by suction filtration and the residue washed with distilled water. The cold filtrate is acidified to pH 1.0 with 6N hydrochloric acid, extracted with ethyl acetate, water washed to pH 6.0, dried and evaporated to dryness. The residue is dissolved in 1N sodium hydroxide, extracted with diethyl ether, and the aqueous phase again acidified to pH 1, extracted with ethyl acetate, water washed, dried and evaporated to dryness to obtain an oil of the titled product.

EXAMPLE 8A

A portion of the titled product of Example 8 is dissolved in about 8 ml. of 1N sodium hydroxide solution, diluted to pH 7.0 with distilled water and extracted with diethyl ether. The aqueous phase is then lyophylyzed (Dry-Ice/chloroform) to obtain the sodium salt of the titled product of Example 8.

EXAMPLE 9

1-[3',4'-Dimethoxy-6'-(5''-carboxypentyl)phenyl]-1-octen-3-one

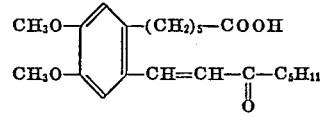

To a stirred solution of 15 gm. of 1-[3',4'-dimethoxy-6'-(6''-hydroxyhexyl)phenyl]-1-octen-3-one in 750 ml. of distilled acetone is dropwise added under nitrogen at room temperature 21 ml. of Jones Reagent. After 20 minutes, the precipitated chromium salts are removed by filtration. The solution is diluted with ice-water and the acetone is removed by evaporation. The residue is extracted with ethyl acetate, water washed, dried over sodium sulfate and evaporated to dryness to obtain an oil which is taken up in diethyl ether and extracted with 1N sodium hydroxide. The aqueous phase is acidified to pH 1.0 with 6N hydrochloric acid, extracted with ethyl acetate, water washed until neutral, dried and evaporated to dryness to obtain the titled product, m.p. 61–66° C.

EXAMPLE 10

1-[3',4'-Dimethoxy-6'-(5''-carboxypentyl)phenyl]-1-octan-3-one

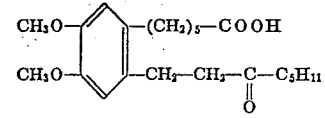

A solution of 9.0 gm. of 1-[3',4'-dimethoxy-6'-(5''-carboxypentyl)phenyl]-1-octen-3-one in 25 ml. of 1N sodium hydroxide solution is shaken atmospherically in the presence of 0.8 gm. of 5% Rhodium on alumina catalyst under hydrogen gas until almost the expected amount of hydrogen has been taken up. The solution is filtered from the catalyst through Celite, acidified to pH 1.0, extracted with ethyl acetate, water washed, dried, evaporated to dryness and purified by column chromatography using silica gel eluting with benzene/chloroform (1:1 increasing to pure chloroform) and the first fraction evaporated *in vacuo* to give an oil of the titled product.

EXAMPLE 11

1-[3',4'-Dimethoxy-6'-(5''-carboxypentyl)-phenyl]-1-octan-3-ol

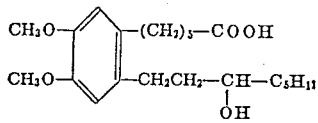

A stirred solution of 3.1 gm. of 1-[3',4'-dimethoxy-6'-(5''-carboxypentyl)phenyl]-1-octan-3-one in 10 ml. of 1N sodium hydroxide solution is added in small portions 1.46 gm. of sodium borohydride. After stirring for 12 hours at 10° C., 2N hydrochloric acid is added slowly to make the solution have a pH 1. The resulting solution is extracted with ethyl acetate, water washed until neutral, dried and evaporated to dryness to obtain an oil of the titled product.

EXAMPLE 12

1-[3',4'-Dihydroxy-6'-(5''-carboxypentyl)phenyl]-1-octan-3-ol

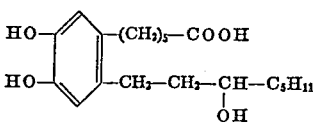

A solution of 3.04 gm. of 1-[3',4'-dimethoxy-6'-(5''-carboxypentyl)phenyl]-1-octan-3-ol in 54 ml. of dry methylene chloride is cooled down to −75° C. Then with stirring is dropwise added 24 ml. of 1 molar solution of Boron tribromide in methylene chloride. After stirring for 30 minutes at −75° C., the temperature of the reaction mixture is allowed to rise to room temperature and ice water added, followed by extraction with ethyl acetate, drying and evaporation to dryness. The residue is subjected to preparative chromatography (20 plates) in chloroform/methanol (93:7) and the product eluted off with ethyl acetate followed by filtration and evaporation to dryness to obtain an oil of the titled product.

EXAMPLE 12A

The oil of the titled product of Example 12 is dissolved in 3 ml. of methanol, nitrogen bubbled through and 3.6 ml. of 1N sodium hydroxide solution added dropwise. The resulting solution is evaporated to remove methanol and the solution distilled with water to pH 7.0 and then extracted with diethyl ether. The aqueous phase is then lylophylyzed (Dry Ice/chloroform) to obtain the sodium salt of the titled product of Example 12.

EXAMPLE 13

Following the procedure of Example 9 there is prepared the following:

(a) 1 - [3',4'-dimethoxy-6'-(6''-carboxyhexyl)phenyl]-1-octen-3-one.

EXAMPLE 14

Following the procedure of Example 8A there are obtained the following:

(a) 1-[3',4'-dimethoxy-6'-(5''-carboxypentyl)phenyl]-1-octen-3-one sodium salt,
(b) 1-[3',4'-dimethoxy-6'-(5''-carboxypentyl)phenyl]-1-octan-3-one sodium salt,
(c) 1-[3',4'-dimethoxy-6'-(5''-carboxypentyl)phenyl]-1-octan-3-ol sodium salt,
(d) 1-[3',4'-dimethoxy-6'-(6''-carboxyhexyl)phenyl]-1-octen-3-one sodium salt.

What is claimed is:

1. A compound of the formula:

$$\text{RO}-\underset{\text{RO}}{\bigcirc}-(CH_2)_n-COOR''$$
$$\overset{H\ H\ R'}{\underset{H\ H\ OH}{\overset{|\ |\ |}{\underset{|\ |\ |}{C-C-C-R^\circ}}}}$$

wherein
R° is straight chain alkyl of 4 to 6 carbon atoms,
R'' is hydrogen or a cation forming a pharmaceutically acceptable salt,
R' is hydrogen or lower alkyl of 1 to 3 carbon atoms,
n is 4, 5 or 6, and
both R which are the same, are hydrogen or lower alkyl of 1 to 3 carbon atoms.

2. A compound of claim 1 in which R is methyl, n is 5 and R° is pentyl.
3. A compound of claim 2 in which R' is hydrogen.
4. A compound of claim 2 in which R' is methyl.
5. A compound of claim 1 in which, R is hydrogen, n is 5, R° is pentyl and R' is hydrogen.
6. The compound of claim 3 in which R'' is hydrogen.
7. The compound of claim 3 in which R'' is sodium.
8. A compound of the formula:

$$\text{RO}-\underset{\text{RO}}{\bigcirc}-(CH_2)_n-COOR''$$
$$\overset{H\ H}{\underset{H\ H\ O}{\overset{|\ |}{\underset{|\ |\ ||}{C-C-C-R^\circ}}}}$$

wherein
R° is straight chain alkyl of 4 to 6 carbon atoms,
R'' is hydrogen or a cation forming a pharmaceutically acetable salt,
n is 4, 5 or 6, and
both R which are the same, are hydrogen or lower alkyl of 1 to 3 carbon atoms.

9. A compound of claim 8 in which R° is pentyl, R is methyl and n is 5.

References Cited

Collet et al.: Chim. Ther. 5(3), 163 (1970).
Sharma et al.: C.A. 72, 78568x (1969).
Lardelli et al.: C.A. 67, 32309g (1967).
Morin et al.: C.A. 70: 37249t (1968).

LORRAINE A. WEINBERGER, Primary Examiner

J. F. TERAPANE, Assistant Examiner

U.S. Cl. X.R.

260—343.3, 448.2 B, 488 CD, 501.1, 590, 600, 613 D, 621 K; 424—316, 317, 331, 333, 341, 346